United States Patent [19]
Szczepanski

[11] 4,168,971
[45] Sep. 25, 1979

[54] HIGH EFFICIENCY GOLD RECOVERY METHOD

[76] Inventor: Leo V. Szczepanski, 4329 N. Bay Rd., Miami Beach, Fla. 33140

[21] Appl. No.: 799,139

[22] Filed: May 23, 1977

[51] Int. Cl.$^2$ ............................................. C22B 11/04
[52] U.S. Cl. .............................. 75/118 R; 75/101 BE; 210/38 B
[58] Field of Search ............. 75/101 BE, 118; 423/24, 423/25; 210/38 B

[56] References Cited

U.S. PATENT DOCUMENTS

| | | | |
|---|---|---|---|
| 2,468,471 | 4/1949 | Thurston | 210/38 B |
| 2,726,141 | 12/1955 | Appell | 210/38 B |
| 3,565,608 | 2/1971 | Anspon | 210/38 B |

FOREIGN PATENT DOCUMENTS

| | | | |
|---|---|---|---|
| 539883 | 4/1957 | Canada | 75/101 BE |
| 289638 | 5/1928 | United Kingdom | 75/83 |

*Primary Examiner*—M. J. Andrews
*Attorney, Agent, or Firm*—Robert B. Kennedy

[57] ABSTRACT

A method and system for recovering gold and other noble metals from geologic bodies of fresh and salt water wherein a mixture of water and sediment is drawn from the body of water, passed as an influent through a cation exchanger of the type containing crosslinked polymer resinous particulates charged with sodium or hydrogen at controlled flow rates, and the exchanger effluent returned to the body of water.

18 Claims, 3 Drawing Figures

HIGH EFFICIENCY GOLD RECOVERY METHOD

BACKGROUND OF THE INVENTION

This invention relates generally to methods and systems for recovering noble metals, and particularly to high efficiency methods and systems for recovering noble metals from geologic bodies of water such as fresh water rivers and lakes, brackish estuaries, and salt water seas and the oceans.

It has long been known that the seas of the world possess an abundance of noble metals such as gold, silver and platinum. To date, however, no industry has yet to evolve for the mining of these precious metals since no economically efficient method has yet been devised for their extraction. The present invention is believed to constitute the discovery of an economically efficient manner in which to harvest noble metals and specifically gold from the sea.

Today there does, of course, exist many methods of recovering noble metals from dilute aqueous solutions under laboratory conditions. For example, in U.S. Pat. No. 2,371,119 a process is disclosed from recovering precious metals from aqueous liquids through the use of anion absorption materials. Since the issuance of this patent in 1942 interest in the use of anion absorption materials has remained as evidenced by the issuance in 1976 of U.S. Pat. No. 3,994,719 which teaches the use of a weakly basic anion absorption material composed of thiourea group containing synthetic resins of a crosslinked, macroporous, vinyl-aromatic base polymer of monovinyl and polyvinyl compounds. U.S. Pat. No. 3,006,756 discloses other such basic absorption materials as does U.S. Pat. No. 3,736,126 which utilizes polymers of lower aliphatic esters of acrylic acid as an absorption bed for the recovery of gold from seawater under laboratory controlled conditions after the seawater has been acidified and chloride ions added thereto to complex the gold.

Along with anion absorption materials has existed the use of anion exchange materials such as that disclosed in U.S. Pat. No. 3,001,868 wherein a nitrogenous anion exchange resin having both weakly and strongly basic amine exchange groups is utilized. U.S. Pat. No. 3,817,745 also discloses the use of crosslinked polymeric N-vinyl-amide and a polyhydroxyaryl compound for this type recovery. U.S. Pat. No. 3,473,921 further teaches the use of chloromethylated styrene divinylbenzene resin reacted with throurea as an ion exchange resin of the basic anion exchanger type for the recovery of gold. In general these recoveries are from cyanide solutions, bearing gold compounds.

In addition to laboratory methods of recovering noble metals from dilute solutions work has also heretofore been done in direct attempts at obtaining precious metals present in but trace quantities from seawater. U.S. Pat. No. 3,155,454, for example, discloses a method of recovering silver from seawater by percolating it through a bed of magnesium ammonium phosphate. U.S. Pat. No. 3,565,608 further teaches such use of water insoluble ethylene copolymer containing carboxylate and/or amide groups. In this latter patent the material is formed as a film which is drug as by a ship through gold containing waters or attached to a buoy located within a current. Recovery of noble metals found in ocean floor nodule ores by halidation has been suggested by U.S. Pat. No. 3,940,470.

It is thus apparent that heretofore materials per se have been developed which have been capable of recovering noble metals from various dilute solutions. Nevertheless, none of these have ever found commercial use in sea mining because they have been economically inefficient. For example, it is of little commercial value to recognize that recovery is possible provided that the sea water first be treated due to the vast quantities of sea water required for processing. Without a practically workable material knowingly available for this usage, it follows that little work has been accomplished in developing a system for such to perform on a workable basis.

Accordingly it is a general object of the present invention to provide a high efficiency method and system for recovering noble metals from geologic bodies of water.

More specifically, it is an object of the invention to provide commercially practical, efficient and economic methods and systems for recovering gold and other noble metals from geologic bodies of water such as fresh water rivers and lakes, brackish estuaries and salt water seas and the oceans.

SUMMARY OF THE INVENTION

In one form of the invention a high efficiency method of recovering gold from the sea is provided wherein a mixture of sea water and seabed sediment is passed through an ion exchanger of the type having cation exchange resinous particulates insoluble in water charged with hydrogen or sodium whereupon the hydrogen or sodium is exchanged for gold.

In another form of the invention a high efficiency method of recovering noble metals from a noble metal bearing geologic body of water such as a fresh water river or lake, a brackish estuary, or a salt water sea or an ocean is provided wherein water is drawn from the body of water, passed through columnated cation exchange crosslinked polymer resinous particulates, and returned to the body of water.

In another form of the invention a high efficiency method of recovering gold from the sea is provided wherein sea water is drawn from the sea and flowed over a substantially water insoluble cation exchange resin charged with sodium or hydrogen.

In another form of the invention a high efficiency method is provided for recovering noble metals from a geologic body of water having a sandy bed comprising the steps of drawing a mixture of water and sediment from adjacent the sandy bed into a conduit, conveying the mixture of water and sediment to a cation exchange column, passing the mixture of water and sediment into the cation exchange column, and returning the water to the geologic body of water.

In yet another form of the invention a system is provided for recovering noble metals from noble metal bearing geologic bodies of water comprising a chamber have an inlet orifice and an outlet orifice, a bed of ion exchange particulates housed within the chamber between the inlet and outlet orifices, a water intake conduit communicating between the chamber inlet orifice having an opening through which water may enter from the body of water in which the conduit opening is submerged, and means for drawing water into the conduit and through the chamber and bed of ion exchange particulates housed therein.

In still another form of the invention a system is provided for recovering gold from the sea comprising a chamber having an inlet orifice and an outlet orifice, a column of cation exchange resinous particulates housed within the chamber, seawater intake conduit means through which sea water may be drawn from the sea and into the chamber through the chamber inlet orifice, and pump means for drawing sea water through the intake conduit into the chamber and through the column of cation exchange resinous particulates.

DESCRIPTION OF THE PREFERRED EMBODIMENTS

Figure 1:
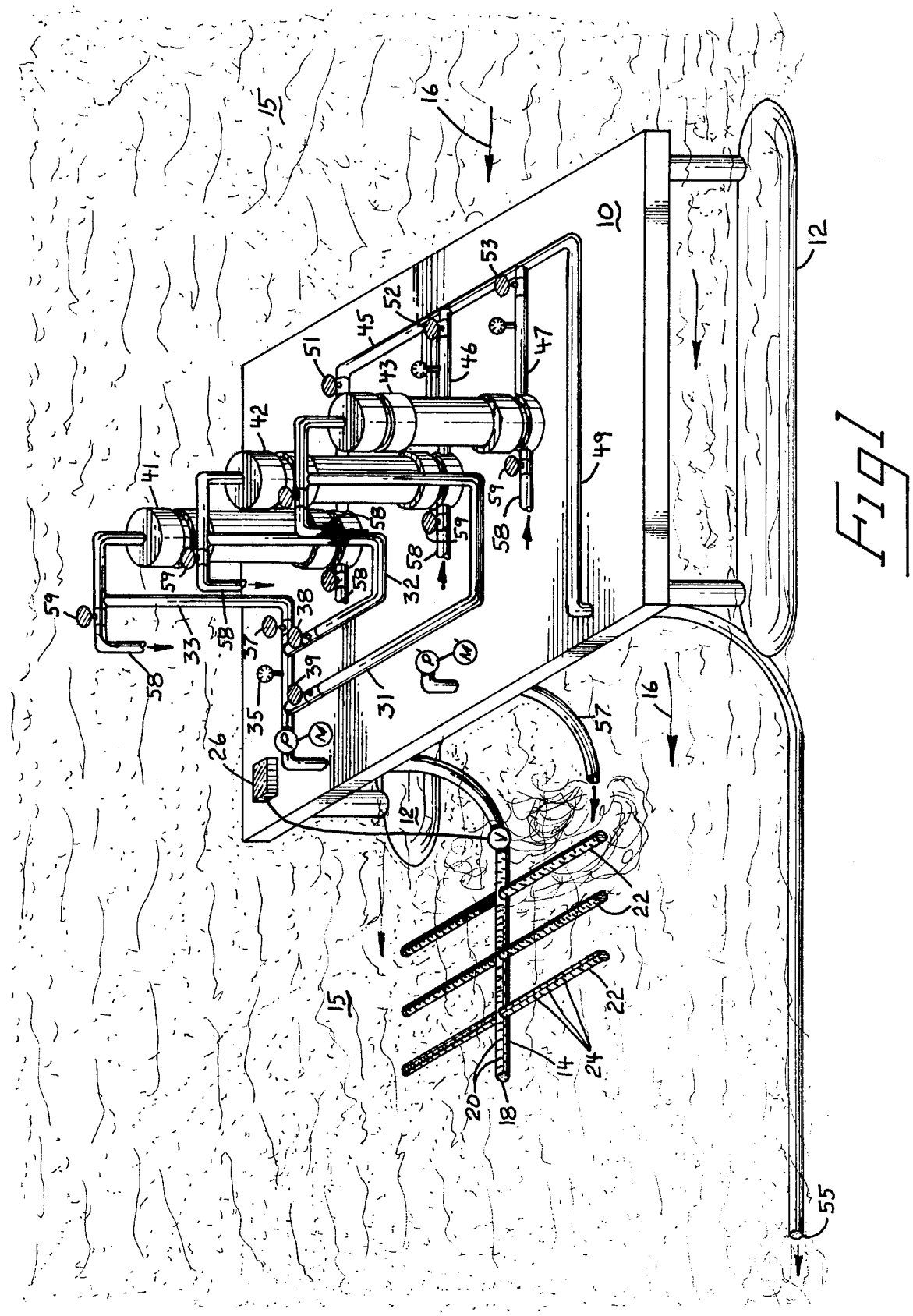
FIG. 1 is a perspective view of a system constructed and utilized in accordance with the present invention shown recovering a noble metal from a sea and its seabed.

Referring now in more detail to the drawing there is shown in FIG. 1 a system for recovering noble metals from geologic bodies of water. This embodiment is seen to include a platform 10 supported upon the surface of a salt-water sea by a pair of pontoons 12. A flexible, water intake conduit 14 is suspended from the platform onto the surface of a sandy seabed 15 downstream from the platform in the sea current indicated by arrows 16. The end 18 of the conduit distal the platform is capped while the periphery is provided with a series of thin slits 20 of 20 screen mesh size. Six branch conduits 22 extend laterally from and communicate with the water intake conduit 20. Each of these branch conduits also has its end capped and is provided with a series of peripheral slits 24 of similar size. A pump P driven by a motor M is provided for drawing a mixture of sea water and sediment from over the seabed into the conduits 14 and 22 through the slits 20 and 24 and through a foot valve V periodically operated by a valve control 26.

With continued reference to FIG. 1 conduit 14 is seen to communicate beyond pump P with three conduits 31, 32 and 33 through a flow meter 35 and three manually operable valves 37, 38 and 39 atop platform 10. The conduits 31, 32 and 33 respectively communicate with an inlet orifice atop three ion exchangers 41, 42 and 43 which are hereinafter described in more detail. Three water discharge conduits 45, 46 and 47 communicate with outlet orifices at the bottom of the ion exchangers and junction with a common flexible discharge conduit 49 after having passed through another set of three flow meters and three manually operably valves 51, 52 and 53. An end portion of the flexible discharge conduit 49 is suspended from beneath the platform 10 with its discharge orifice 55 positioned downstream the water intake conduits 14 and 22. Means for agitating the surface of the seabed about the water intake conduits 14 and 22 are provided here in the form of air pump P' driven by motor M' to which an air hose 57 is connected. Such mechanical stirring means are chiefly used where natural means are not present in coves and stagnant fresh water. Exchanger backwash lines 58 and valves 59 are also provided which are shown with their end portions broken away.

Figure 2:
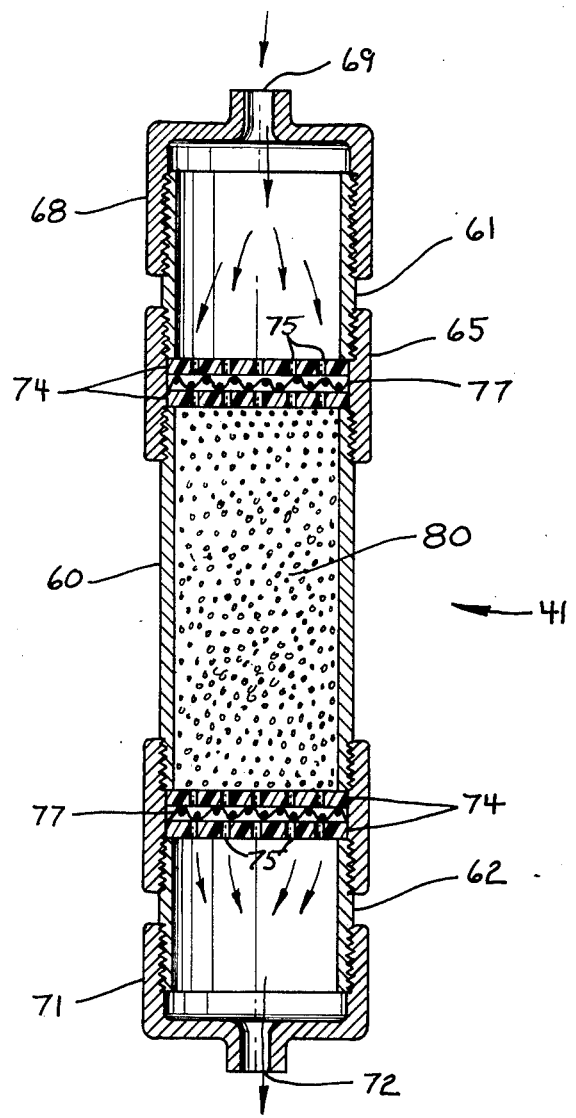
FIG. 2 is a cross-sectional view of one of the three ion exchangers of the system illustrated in FIG. 1.
Figure 3:
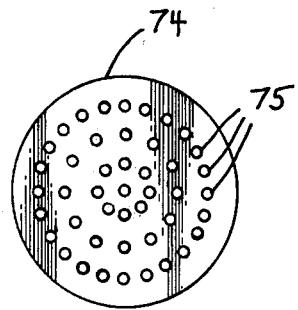
FIG. 3 is a plan view of one of the four screen holding disc components of the ion exchanger shown in FIG. 2.

With reference next to FIGS. 2 and 3 the ion exchanger 41, as are the other two exchangers 42 and 43, are each seen to comprise a central cylindrical chamber 60 measuring 47 inches in length and 8 inches in diameter, an upper cylindrical chamber 61, and a lower cylindrical chamber 62 secured coaxially together by threaded collars 65 and 66. An upper cap 68 having an inlet orifice 69 is threaded upon the upper chamber 61 while a lower cap 71 having an outlet orifice 72 is threaded upon the lower chamber 62. A pair of plastic discs 74 having a set of apertures 75 therethrough are rigidly mounted between confronting ends of the central and upper cylindrical chambers and the central and lower chambers. Each pair of discs are sandwiched about a 24-52 mesh screen 77. A columnated bed of 55 pounds of ion exchange particulates 80 of size incapable of passing through the screens 77 are disposed within the central chamber.

The ion exchange material itself should meet several chemical specifications. Firstly, it should be substantially water insoluble. Secondly, it should function as a cation exchange resin. And thirdly, the resin preferably should be charged initially with hydrogen or sodium.

An ion exchange material meeting the above listed specifications is sulfonated copolymer of styrene divinylbenzene. Such a cation exchange material is commercially available from the Rohm and Haas Company of Philadelphia, Pennsylvania as their Amberlite 1R-120 Plus cation exchange resin which heretofore has been used for recovering copper from leach solutions. This material is in particulate form and measures between 0.45 and 0.60 millimeters in diameter. The material should be positioned as a column measuring at least 20 inches in height. Preferably, the gold bearing water is flowed at controlled rates downwardly through the column although such flow direction is not mandatory.

In operation, the seabed upon which conduits 14 and 22 rest is agitated by airline 57 and mixture of sea water and seabed sediment drawn into the water intake conduits through slits 20 and 24. These slits serve as sieves to prevent large globules of sludge from entering and clogging the system. The mixture of sea water and sediment is then drawn into the ion exchanger inlet orifices and down through the upper discs 74 and screen filter 75 which filter prevents all but the very small particles of sediment from passing into contact with the column of resinous particulates. The sea water and sediment carried therein is then flowed through the column of cation exchange particulates at a first substantially uniform rate of approximately 18 gallons per minute per cubic foot of exchange particulates. This causes gold in the sea water as well as gold in the sediment to be exchanged by the particulates. Typically, the gold in the water is in solution in ionic form while the gold in the sediment is in oxide form. Over a period such as several days the flow rate is decreased until an operation is completed.

Proper control of the flow rate is quite important. What is ideal, however, depends upon many operational conditions including the proportion of sediment to sea water drawn as well as the average size of the sediment processed. In general, the higher the ratio of sediment to water, the better the yield. However, too high a ratio will lead to system clogging and a decrease in flow rate. Furthermore, if large globs of sludge enter the system, the flow rate will drop drastically on its own volition thereupon promptly necessitating a backwash operation. This can, of course, be controlled automatically by conventional control systems.

If clogging is successfully avoided then the flow rate will ordinarily slowly decrease on its own as sediment deposits on the exchange particulates. For example, it is common for the flow rate to decrease by itself from 18 to 12 gallons per minute within the first 12 hours of operation. However, if no decrease is observed in a 6 hour period an incremental decrease should then be positively initiated, say to 15 gallons per minute, to maximize yield. Additional incremental decreases are made until, for example, a flow rate of but some 2 to 4 gallons per minute is employed at the end of a 10 to 15 day run. This too may be done through automated controls.

After an operation has been completed the metallic gold may be recovered from the particulated by any number of conventional processes. For example, the particulates may be dehydrated and burned to a char which is then placed in a solution such as aqua regia and recovered by precipitation or electrolysis. Or, the char may be further heated and the gold recovered by melding and fusion.

Again it is emphasized that the flow rate should be carefully monitored and controlled for maximum yield. A lack of appreciation of its role, along with the importance of processing a mixture of sea water and sediment, has no doubt been responsible in a large measure for the present discovery to have been so long in coming. In addition to the previously discussed factors, it is pointed out that too slow of a flow rate is productive of inefficiency since it takes too long of a period of time in which to effect industrially economical recovery. A high flow rate is desirable but is limited by the structural integrity of system materials and joints and contact time. The following data evidence this which was actually obtained in sea water off the coast of Florida using the just described system embodiment and method but with one instead of three ion exchangers working. No pretreatment of the water or sediment was made.

| FLOW RATES* | DURATION | GOLD RECOVERED |
|---|---|---|
| 1. 18 to 2 | 13.5 days | 6.40 troy ozs. |
| 2. 14 to 2 | 13.5 days | 3.84 troy ozs. |
| 3. 14 to 2.5 | 11.7 days | 2.35 troy ozs. |

*Gallons per minute to cubic foot particulate

It therefore is seen that a method and system for recovering noble metals from the sea with industrially economic efficiency has finally been discovered and developed which does not necessitate pretreatment of sea water or seabed sediment. Though a preferred embodiment has been illustrated and described it should be understood that numerous changes, additions and deletions may be made thereto without departure from the spirit and scope of the invention as set forth in the concluding claims. For example, though a mixture of sea water and sediment is drawn into the ion exchangers in the preferred embodiment, the intake of sediment is not essential but rather preferable for maximum yields. Though the sea water has been the supply of gold here, fresh or brackish gold-bearing bodies of water may also be used. And though gold has been the noble metal recovered by the particularly described method, other noble metals may also be obtained where present in the geologic body of water being mined.

I claim:

1. A high efficiency method of recovering gold from the sea wherein sea water mixed with a significant quantity of seabed sediment is passed through an ion exchanger of the type having cation exchange resinous particulates substantially insoluble in water charged with hydrogen or sodium whereupon hydrogen or sodium is exchanged for gold.

2. A high efficiency method of recovering gold from the sea in accordance with claim 1 wherein the gold is subsequently extracted from the resinous particulates.

3. A high efficiency method of recovering gold from the sea in accordance with claim 2 wherein gold is recovered from the resin particulates by dehydrating the particulates, heating the dehydrated particulates to form a char, dissolving the char in a liquid, and participating gold from the liquid.

4. A high efficiency method of recovering gold from the sea in accordance with claim 1 wherein the mixture of sea water and seabed sediment is passed through an ion exchanger of the type having crosslinked polymer cation exchange resinous particulates.

5. A high efficiency method of recovering gold from the sea in accordance with claim 1 wherein the mixture of sea water and seabed sediment is passed through an ion exchanger of the type having sulfonic cation exchange resinous particulates.

6. A high efficiency method of recovering gold from the sea in accordance with claim 1 wherein the mixture of sea water and seabed sediment is passed through an ion exchanger of the type having cation exchange resinous particulates comprised of polystyrene.

7. A high efficiency method of recovering gold from the sea in accordance with claim 6 wherein the mixture of sea water and seabed sediment is passed through an ion exchanger of the type having cation exchange resinous particulates comprised of polystyrene.

8. A high efficiency method of recovering gold from the sea in accordance with claim 6 wherein the mixture of sea water and seabed sediment is passed through an ion exchanger of the type having cation exchange resinous particulates comprised of sulfonated polystyrene.

9. A high efficiency method of recovering gold from a geologic body of water having a sandy bed comprising the steps of drawing a mixture of water and sediment from adjacent the sandy bed into a conduit, conveying the mixture of water and sediment into the cation exchange column, and returning the water to the geologic body of water.

10. A high efficiency method of recovering gold from a geologic body of water in accordance with claim 9 wherein the cation exchange column houses columnated cation exchange particulates, and wherein the mixture of water and sediment is passed through the cation exchange column at a flow rate of between 1 and 20 gallons per minute per cubic foot of cation exchange particulates.

11. A high efficiency method of recovering gold from a geologic body of water in accordance with claim 10 wherein the mixture is passed through the cation exchange colume at a rate in excess of 12 gallons per minute per cubic foot of cation exchange particulates and then at a rate less than 12 gallons per minute per cubic foot of cation exchange particulates.

12. A high efficiency method of recovering gold from the sea comprising the steps of drawing a mixture of sea water and sediment from adjacent the seabed into a conduit; conveying the mixture of sea water and sediment through a sieve and into contact with columnated cation exchange crosslinking polymer resin particulates charged with hydrogen or sodium; and returning the sea water to the sea.

13. A high efficiency method of recovering gold from the sea in accordance with claim 12 wherein the mixture of sea water and sediment is conveyed into contact with a sulfonated copolymer of styrene divenylbenzene charged with hydrogen or sodium.

14. A high efficiency method of recovering gold from the sea in accordance with claim 12 wherein the seabed is agitated while the mixture of sea water and sediment is being drawn from the seabed into a conduit.

15. A high efficiency method of recovering gold from the sea in accordance with claim 12 wherein the sea water is returned to the sea downstream from where the mixture of sea water and sediment was drawn into the conduit from adjacent the seabed.

16. A high efficiency method of recovering gold from the sea in accordance with claim 12 wherein the drawing of sea water and sediment from adjacent the seabed into a conduit is periodically interrupted whereupon the conduit is periodically moved upon the seabed.

17. A high efficiency method of recovering gold from the sea in accordance with claim 12 wherein the mixture of sea water and sediment is drawn into the conduit through a sieve.

18. A high efficiency method of recovering gold from the sea in accordance with claim 12 wherein the columnated cation exchange crosslinked polymer resin particulates are periodically backwashed.

* * * * *